(Model.)

J. H. SHAW.
FASTENER FOR MEETING RAILS OF SASHES.

No. 369,885. Patented Sept. 13, 1887.

Witnesses
J. N. Shumway
Fred C. Earle

John H. Shaw, Inventor
By atty.

ered to the top rail of the lower sash.

UNITED STATES PATENT OFFICE.

JOHN H. SHAW, OF NEW HAVEN, CONNECTICUT, ASSIGNOR TO SARGENT & COMPANY, OF SAME PLACE.

FASTENER FOR MEETING-RAILS OF SASHES.

SPECIFICATION forming part of Letters Patent No. 369,885, dated September 13, 1887.

Application filed June 6, 1887. Serial No. 240,404. (Model.)

*To all whom it may concern:*

Be it known that I, JOHN H. SHAW, of New Haven, in the county of New Haven and State of Connecticut, have invented a new Improvement in Sash-Fasteners; and I do hereby declare the following, when taken in connection with accompanying drawings and the letters of reference marked thereon, to be a full, clear, and exact description of the same, and which said drawings constitute part of this specification, and represent, in—

Figure 1:
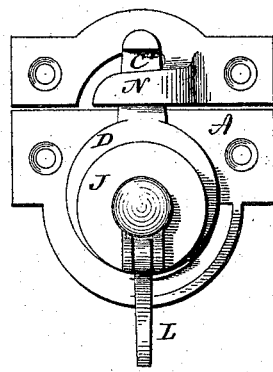
Figure 2:
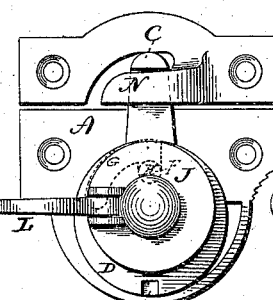
Figure 3:
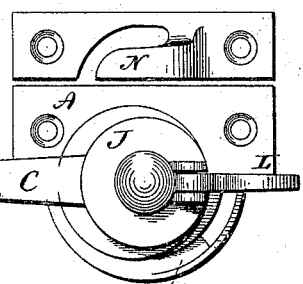
Figure 4:
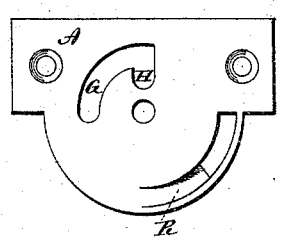
Figure 5:
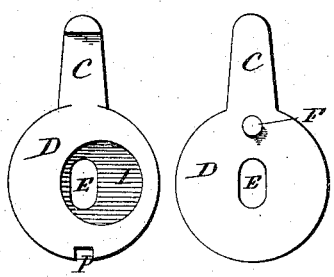
Figure 6:
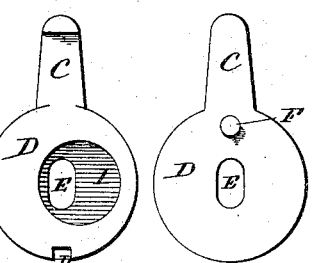
Figure 7:
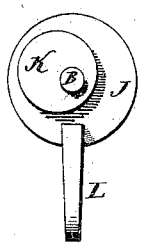
Figure 8:
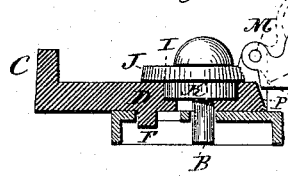
Figure 9:
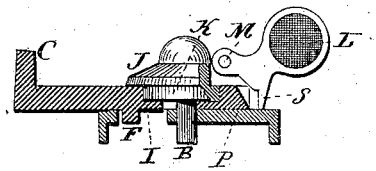
Figure 10:
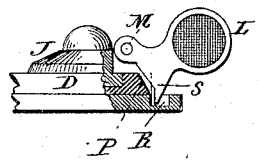
Figure 11:
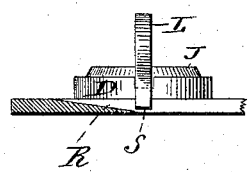

Figure 1, a top view showing the parts as when the hook has reached its closed position; Fig. 2, a top view showing the parts as when the hook has been drawn radially inward to its complete locking position; Fig. 3, a top view showing the parts in the extreme open position; Fig. 4, a top view of the base; Fig. 5, a top view of the hooked disk; Fig. 6, an under side view of the hooked disk; Fig. 7, an under side view of the disk J, showing its handle; Fig. 8, a vertical central section through the hooked disk and base when in the position seen in Fig. 1, but without the inclined plane upon which the handle works; Fig. 9, the same section as in Fig. 8, showing the handle provided with the projection S to work upon the incline; Fig. 10, a partial section showing the handle in the extreme down position after passing from the incline; Fig. 11, a sectional front view showing the handle in the position of just commencing to ride up the incline.

This invention relates to an improvement in sash-fasteners, such as are adapted to be secured to the meeting-rails of sashes, and such as consist of a lever hung upon the top rail of the lower sash and adapted to engage or disengage a keeper on the lower rail of the upper sash by turning the lever correspondingly in a horizontal plane, and particularly to that class of sash-fasteners in which the engaging-lever is made in two parts, the one part being in the nature of a hook hung upon a base on the top of the lower sash, so as to swing into or out of engagement with the keeper on the lower rail of the upper sash, the other part of the lever adapted to oscillate in a horizontal plane upon a pivot on the same base as the hook is hung, the second part of the lever serving as a handle, and so that by an over-motion of the handle after the hook is engaged with the keeper the two parts of the sash are drawn together.

A represents the base, which is adapted to be secured to the top rail of the lower sash. In this base a vertical post, B, is securely fixed as a pivot upon which the parts may turn. Onto the base the hook C is placed. This hook projects from a disk, D, which rests directly upon the base, the disk being constructed with an elongated slot, E, in line with the hook C, as seen in Fig. 5, this elongated slot being adapted to set over the post B and permit a rotary movement of the disk and hook, and also a longitudinal movement of the hook and disk—that is, a movement in the direction of the length of the hook.

Upon the under side of the disk D is a downwardly-projecting stud, F, which works in a slot or groove, G, in the base, this groove being of segment shape and concentric with the post B, and directly in line with the hook when in the closed position is a notch, H, projecting inward from the slot G, as seen in Fig. 4, this slot and notch corresponding to the stud F upon the under side of the disk D, and so that the disk with its hook set upon the base around the post B, the stud F standing in the slot G, may rotate around the post, the slot G causing it to move in a concentric relation to the stud F, except when in the closed position—such, say, as indicated in Fig. 1. Then if the hook be drawn inward the stud F will enter the notch H, and while standing there will be prevented from rotative movement; but when the hook is forced radially from the post to bring the stud F again into line with the slot G, then the rotative or opening movement of the hook may be made.

In the upper side of the disk D is an eccentric recess, I.

Above the disk D a second disk, J, is arranged concentrically around the post B. Upon the under side of this disk and around the post B is an eccentric, K, in shape and size corresponding to the eccentric recess I in the disk below, and so that when the disk J is set upon the disk D the eccentric K will stand in the eccentric recess I, as seen in Figs. 8 and 9. The eccentric substantially forms the pivot upon which the disk with its hook rotates, the disk being permitted transverse movement under the operation of the eccentric. To this end the slot E is broader than the diameter of the post B.

To the disk J a handle or lever, L, is hung upon a pivot, M, so as to swing in a vertical plane, and by which the disk J may be rotated around the post B as a center.

The two parts being arranged and secured together, (the post B preferably being also the means for securing the parts together,) and the stud F standing in the concentric slot G—say in the position seen in Fig. 3, which is the open position—if now power be applied to the handle L, tending to throw the hook C to the closed position, the eccentric K in the eccentric recess I on the disk D serves only as a connection between the handle and hook, because it cannot otherwise act so long as the stud of the hook rests in the concentric slot G. Therefore the movement from the position seen in Fig. 3 to that in Fig. 1 will bring the hook to the closed position, as seen in Fig. 1, and into line with the notch H. At this point, the hook being free for radial movement, the eccentric K is now free to act, and because of its eccentricity to the post or pivot B, and working in the corresponding eccentric recess I in the disk D, the continued movement of the handle L to the position seen in Fig. 2 will impart a radial movement to the hook and draw it toward the post or pivot, and bring the stud F into the notch H, as indicated in Fig. 2.

N represents the keeper, which is adapted to be made fast to the bottom rail of the upper sash, and is constructed in the usual manner for the engagement of the hook, and so that as the hook is drawn inward from the position seen in Fig. 1 to that seen in Fig. 2 the nose of the hook will engage the keeper, and the keeper, being secured to the upper sash, will cause the two sashes to be drawn together in the usual manner for this class of fasteners.

In the opening movement, starting from the position seen in Fig. 2, the first part of the movement of the handle L, which will bring it to the position seen in Fig. 1, will cause the eccentric K to act upon the hook and force it radially outward to the position seen in Fig. 1, and bring the stud on the hook again into line with the eccentric-slot G, and then the continued further turning of the handle, as to the position seen in Fig. 3, will cause the hook to swing around away from the keeper, its stud moving through the concentric slot G.

To interlock the handle with the hook, so that the handle may act directly upon the hook in its swinging movement, instead of solely through the eccentric, the handle is hinged to the disk J, and a downward projection, O, therefrom is adapted to engage a corresponding notch, P, in the disk D when the handle is in line with the hook—that is, in the position seen in Figs. 1 and 3, and also seen in Figs. 8 and 9—and so that while moving through the concentric slot G the handle L will act upon the hook portion as if a rigid part of it, and produce the rotative movement substantially independent of the disk J; but when the hook is brought to the closed position, as seen in Fig. 1, then the handle raised from engagement with the disk D, as indicated in broken lines, Fig. 8, will leave the handle free from the disk D, and so that a further turning of the handle will impart the before-mentioned rotative movement to the disk J and its eccentric carrying them to the position seen in Fig. 2. On the return of the handle, when it arrives into line with the notch P in the disk D, it will naturally drop therein and re-engage the disk and hook, so that by continued movement of the handle it will impart the opening movement to the hook and bring it to the position seen in Fig. 3.

To make the disengagement between the handle and the disk D automatic, I construct the base A with an inclined plane, R, upon its upper face concentric with the post B and outside the disk D. Upon the under side of the handle is a downward projection, S, directly in line with the incline R. (See Figs. 4, 10, and 11.) The highest point of this incline terminates in the radial line of the notch H in the base. The projection S on the handle L bears upon this incline as it is rotated, and gradually rises until it reaches the central position, (seen in Figs. 1 and 8, where it has reached the highest point of the incline,) and at that time escapes from the notch P in the disk D and stands free to continue its movement independent of the disk to impart to the disk D and hook the drawing movement before described. The projection S, after it passes from the incline R, rides upon the upper surface or higher portion of the base. Then on the return the projection S reaches the incline at the time the hook has escaped from the notch H, and then as the handle commences to fall or ride down the incline, engagement is made between the handle and disk D, so that the disk D, with its hook, receives the rotation imparted by the handle, as before described, the handle remaining in engagement with the hook, as seen in Fig. 10, while it stands in the open position.

By constructing the handle so as to make positive engagement with the hook, the eccentric on the disk J performs no office further than that of imparting the required radial movement to the hook.

I claim—

1. The combination, in a sash-fastener, of the base A, disk D, constructed with the hook C arranged on said base, the said disk constructed with an elongated opening, E, a central post on the base extending through said elongated opening, the said base constructed with a concentric slot, G, and a radial notch, H, opening therefrom, the disk D constructed with a stud, F, corresponding to said slot and notch, the said disk D also constructed with an eccentric-recess, I, in its upper face, with a disk, J, arranged concentrically upon said base B and above said disk D, the said disk J constructed with an eccentric, K, upon its under face adapted to work in the said eccentric-recess I in the said disk D, the said disk J provided with a handle, by which rotation may be imparted to it, and a keeper with which the said hook is adapted to engage, substantially as described.

2. The combination of the base A, the disk D, provided with a hook, C, and constructed with an elongated central recess, E, a post fixed in said base and extending upward through said opening E, the base constructed with a concentric slot, G, and radial notch H, opening therefrom, the disk D constructed with a stud, F, corresponding to said slot and notch, the disk also constructed with an eccentric-recess, I, in its upper surface and with a notch, P, in its periphery, the disk J, concentrically arranged upon said post B above the disk D, the said disk J constructed with an eccentric, K, upon its under side adapted to work in the eccentric-recess I in the disk D, the handle L, hinged to said disk J so as to swing in a vertical plane and adapted to engage said notch P in the disk, and a keeper with which said hook is adapted to engage, substantially as described.

3. The combination of the base A, a vertical post, B, thereon, the disk D, arranged upon said post and constructed with the hook C, the said disk adapted for both radial and rotative movement and constructed with an eccentric-recess, I, in its upper surface, the disk J, concentrically arranged upon said post B and constructed with an eccentric, K, upon its under side corresponding to the eccentric-recess in the disk D, the disk D also constructed with a notch, P, the handle L, hinged to said disk J and so as to swing in a vertical plane, and adapted to engage the said notch P in the disk D, the base constructed with an incline, R, and the handle with a corresponding projection, S, adapted to work upon said incline, with a keeper with which the said hook is adapted to engage, substantially as described.

JOHN H. SHAW.

Witnesses:
 WM. S. COOKE,
 A. S. LYLINE.